May 22, 1962
A. C. GROTH
3,035,849
CHILD'S COASTER WAGON
Filed Nov. 29, 1960
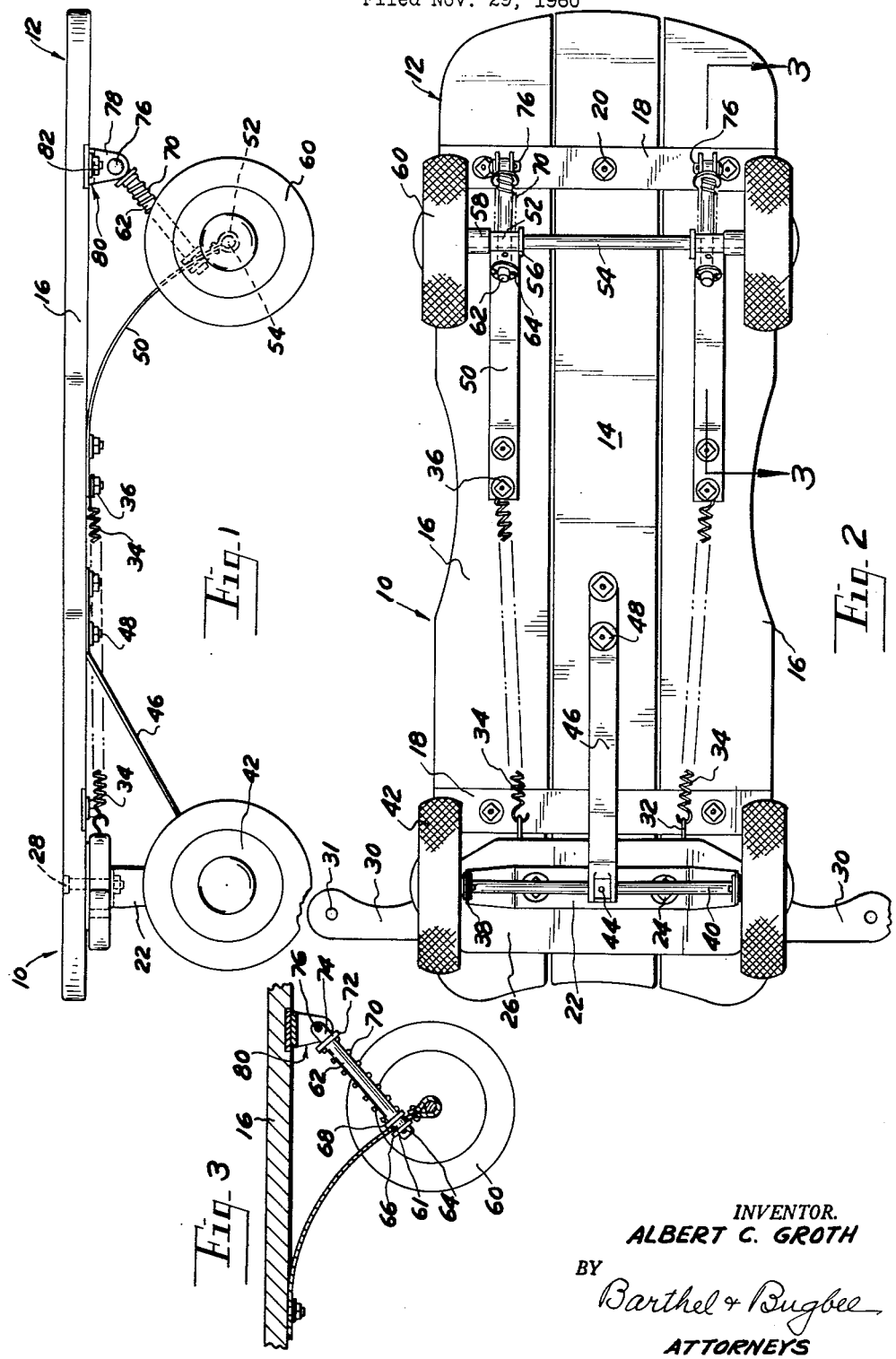
INVENTOR.
ALBERT C. GROTH
BY
Barthel & Bugbee
ATTORNEYS

United States Patent Office 3,035,849
Patented May 22, 1962

3,035,849
CHILD'S COASTER WAGON
Albert C. Groth, 311 N. Harvey Ave., Plymouth, Mich.
Filed Nov. 29, 1960, Ser. No. 72,474
3 Claims. (Cl. 280—87.01)

This invention relates to children's coaster wagons and, in particular, to rear axle suspensions for such wagons.

One object of this invention is to provide a child's coaster wagon having an improved rear axle suspension which not only absorbs shocks encountered by either of the rear wheels but also controls the limits of motion of the springs used in the suspension.

Another object is to provide a child's coaster wagon of the foregoing character wherein the rear axle is resiliently supported by cantilever leaf springs which are also coupled resiliently to swinging links pivotally connected to the coaster wagon bed.

Other objects and advantages of the invention will become apparent during the course of the following description of the accompanying drawings, wherein:

FIGURE 1 is a side elevation of a child's coaster wagon equipped with the rear axle suspension according to one form of the invention;

FIGURE 2 is a bottom plan view of the coaster wagon shown in FIGURE 1; and

FIGURE 3 is a vertical longitudinal section through one of the cantilever springs, links and pivot blocks, taken along the line 3—3 in FIGURE 2.

Referring to the drawing in detail, FIGURES 1 and 2 show a child's coaster wagon, generally designated 10, according to one form of the invention as having a bed 12 composed of a central board 14 and side boards 16 interconnected by cleats 18 bolted or otherwise secured thereto as at 20. The coaster wagon 10 is provided with a front axle supporting bracket 22 (FIGURE 2) bolted as at 24 to a base board 26 which in turn is drilled vertically to receive a central pivot bolt 28 (FIGURE 1) which also passes through a similarly-drilled center board 14. The base board 26 at its opposite ends is provided with outwardly-projecting handles 30 which are engaged by the hands or feet of the user for the purpose of steering the coaster wagon 10 by turning the base board 26 about its central pivot bolt 28. The handles 30 are drilled at 31 to receive the ends of a tow rope (not shown). Hooks 32 (FIGURE 2) are mounted in the rearward edge of the base board 26 at locations spaced laterally apart from the pivot bolt 28 to receive the forward ends of centering tension springs 34, the rearward ends of which are hooked to bolts 36 passing through the side boards 16 of the bed 12.

The opposite ends of the front axle bracket 22 are bent downward as at 38 parallel to one another and perpendicular to the bed 12 and drilled to receive the front axle 40, the opposite ends of which carry rubber-tired wheels 42. A coupling bolt 44 engages the front axle 40 at the midportion thereof immediately below and coaxial with the pivot bolt 28. The coupling bolt 44 is so joined to the front axle 40 and so passes through the front end of a rearwardly-inclined front axle brace 46 as to permit horizontal swinging of the front axle 40 around the vertical pivot bolt 28 as an axis while engaging the inclined front axle brace 46 which strengthens the steering construction. The upper and rearward end of the front axle brace 46 is bolted or otherwise secured as at 48 to the centerboard 14 of the bed 12.

The same bolts 36 which serve as anchorages for the rearward ends of the centering springs 34 also serve to secure the forward ends of arcuate cantilever leaf springs 50 to the side boards 16 of the wagon bed 12. The leaf springs 50 curve downwardly and rearwardly in a forwardly concave and rearwardly convex shape and at their lower ends are looped as at 52 around a rear axle 54 outwardly of retaining collars 56 (FIGURE 2) welded or otherwise secured thereto. The loops 52 are held around the axle 54 by riveting or other suitable means. Rotatably mounted on the outer ends of the rear axle 54 are the hubs 58 of rubber-tired rear wheels 60, the spring loops 52 being positioned between the collars 56 and hubs 58.

The leaf springs 50 a short distance above their loops 52 and also above the rear axle 54 are drilled as at 61 (FIGURE 3) for the passage of links 62 in the form of rods of circular cross-section. The lower end of each of the links or rods 62 is drilled transversely to receive a cotter pin 64 (FIGURE 2) which serves to retain the lower end portion of each cantilever spring 50 in assembly with a pair of washers 66 and 68 (FIGURE 3) located on opposite sides thereof. The upper washer 68 serves as a spring abutment for a compression spring 70, the upper end of which engages an abutment shoulder or collar 72 secured to or integral with the rod or link 62.

Each link 62 is inclined upwardly and rearwardly, and its upper end 74 is drilled transversely to receive a pivot bolt 76. Each pivot bolt 76 passes through the suitably-drilled parallel ears 78 of a link-supporting bracket 80 which is bolted as at 82 through the rearward cleat 84 to its respective side board 16.

In the use of the coaster wagon 10 of the present invention, the operator either sits, kneels or lies upon the bed 12 and either engages the handles 30 with his feet or grasps them in his hands, depending upon his position. He then propels the coaster wagon 10 either by his feet, or by being pulled by another person through the aid of a tow rope (not shown) inserted through the holes 31. Alternatively, of course, the coaster wagon may be used on a down grade, in which case the force of gravity of course propels the wagon 10.

As the wagon 10 is propelled in any one of these ways, or pushed by another person grasping the rearward end of the bed 12, the person grasping the handles 30 steers the wagon 10 by pushing upon one and pulling backward on the other to swing the base 26 and consequently the front axle 40 around the vertical pivot bolt 28 as an axis. When the handles 30 are released, the centering springs 34 pull the base board 26 back into its original position wherein the front axle 40 is parallel to the rear axle 54 and the coaster wagon accordingly moves forward in a straight line.

Ast the coaster wagon 10 moves over the ground, any shocks transmitted to the rear wheels 60 through encountering stones, ruts or other obstacles, will force either or both ends of the rear axle 54 upward, carrying with it the loops 52 at the lower ends of the cantilever springs 50. This action swings the cantilever spring 50 in an upward and rearward direction, at the same time swinging the links or rods 62 about their pivot bolts 76 and compressing the springs 70, thereby absorbing the shock of the encounter. As the rear wheels 60 pass beyond the obstacle, the loops 52 on the lower ends of the cantilever springs 50 move downward, impelled by the resilience not only of the leaf springs 50 themselves but also by the force received from the previously-compressed helical springs 70 around the links or rods 62.

What I claim is:

1. A child's coaster wagon comprising an elongated substantially horizontal bed structure having a front axle steerably mounted thereon and front wheels rotatably mounted on said front axle; a pair of leaf spring members secured in laterally-spaced cantilever relationship near their forward ends to the lower side of said bed structure intermediate the opposite ends thereof and inclined downwardly and rearwardly relatively thereto, a rear axle member mounted adjacent the rearward ends of said leaf springs, rear wheels rotatably mounted on said rear axle member, link brackets secured in laterally-spaced relationship to the lower side of said bed structure near the rearward end thereof, a link pivotally connected to each link bracket and inclined downwardly and forwardly therefrom into proximity to the rearward end of each leaf spring member, coupling means slidably and guidingly connecting each link to one of said members, and a coil spring encircling each link and disposed with its lower end yieldingly engaging its respective leaf spring member.

2. A child's coaster wagon, according to claim 1, wherein a loop portion extends from the rearward end of each leaf spring member around said rear axle member in retaining relationship therewith.

3. A child's coaster wagon, according to claim 1, wherein said leaf spring members are of arcuate configuration with their lower sides concave and their upper sides convex.

References Cited in the file of this patent

UNITED STATES PATENTS

| | | |
|---|---|---|
| 1,487,459 | Hampson | Mar. 18, 1924 |
| 1,595,732 | Rautenberg et al. | Aug. 10, 1926 |
| 1,921,818 | Haagen | Aug. 8, 1933 |